Patented Oct. 17, 1950

2,525,961

UNITED STATES PATENT OFFICE 2,525,961

CELLULOSE ETHERS AND ESTERS PLASTICIZED WITH A DI-(CHLORO-BUTOXY-BUTYL) PHTHALATE

Gershon J. Shugar, Jersey City, N. J., assignor to Celanese Corporation of America, a corporation of Delaware No Drawing. Application June 11, 1947, Serial No. 754,052

6 Claims. (Cl. 106—179)

This invention relates to certain thermoplastic compositions and relates more particularly to thermoplastic compositions of matter comprising a synthetic resin, cellulose acetate or other cellulose derivative material plasticized with certain chlorobutyl and chlorobutoxy butyl esters of organic acids.

An object of this invention is the provision of improved thermoplastic compositions having a basis of a synthetic resin, cellulose acetate, or other cellulose derivative, and plasticized with chlorobutyl and chlorobutoxy butyl esters of organic acids.

Other objects of this invention will appear from the following detailed description.

I have now found that the chlorobutyl as well as the chloro-butoxy butyl esters of various organic acids of the following general formula:

wherein $n$ is a whole number not greater than 2, X is hydrogen or

and R is a member of the group consisting of alkylene and arylene radicals, are excellent solvent and plasticizing agents for certain synthetic resins as well as for cellulose acetate or other cellulose derivative materials.

These esters may be obtained in excellent yield by catalytically reacting tetramethylene oxide under refluxing temperature with the acid chloride of the corresponding monobasic and polybasic organic acid whose chlorobutyl or chlorobutoxy butyl ester is desired. The reaction effectively opens the tetra-methylene oxide ring and causes a molecular rearrangement whereby chlorobutyl and chlorobutoxy butyl esters of the organic acid are formed. Preferably, I employ a catalyst such as anhydrous zinc chloride, aluminum chloride, concentrated sulfuric acid or concentrated phosphoric acid to aid the reaction. The catalysts employed may be present in an amount of from 0.5 to 5.0% by weight on the tetramethylene oxide undergoing reaction.

Thus, by reacting tetramethylene oxide at reflux temperature with the acid chlorides of monobasic and polybasic organic acids, such as, for example, phthalyl dichloride, stearyl chloride, heptoic acid chloride, caproyl chloride, capric acid chloride, lauroyl chloride, succinyl di-chloride, adipyl di-chloride or sebasic acid di-chloride, the corresponding chlorobutyl and chlorobutoxy butyl esters of these acids are obtained.

In forming the novel plasticized compositions of my invention, the chlorobutyl and chlorobutoxy butyl esters may be incorporated in the thermoplastic cellulose derivative or other compounds being plasticized in amounts of from about 5 to 75 parts or more by weight for each 100 parts by weight of cellulose derivative or other plasticizable compound present. When forming plasticized compositions which are to be employed in molding operations, the plasticizer may be placed on the thermoplastic compound with or without the aid of a volatile solvent in which it may be dissolved, to assist in uniformly distributing the plasticizer. A Banbury mixer may be used to mix the plasticizer with the resin or cellulose derivative. If a solvent is employed, the latter may then be evaporated, the composition thoroughly mixed or compounded with pigments or other effect materials on hot mixing rolls, for example, and after rolling the uniformly mixed composition out into thin sheets and cooling the same, the sheets may then be broken up into the form of a molding powder. In forming plasticized films and foils, the desired amount of plasticizer and cellulose derivative base material or other plasticizable base material being employed are usually dissolved in a volatile solvent or mixture of volatile solvents and the resulting dope or solution cast into films or foils on a suitable surface as, for example, a rotating drum or wheel. The volatile solvent evaporates leaving a film or foil of the cellulose derivative base material which may then be stripped from the surface upon which it is formed and taken up in roll or other form.

As examples of organic derivatives of cellulose which may be plasticized with said chlorobutyl esters there may be mentioned cellulose esters such as cellulose nitrate, cellulose acetate, cellulose propionate, cellulose butyrate, cellulose acetate-propionate, and cellulose acetate-butyrate as well as cellulose ethers such as ethyl cellulose and benzyl cellulose.

As examples of polyvinyl compounds with which the chlorobutyl organic acid esters are compatible there may be mentioned polyvinyl chloride, polyvinyl acetate as well as copolymers of polyvinyl chloride and polyvinyl acetate. The chlorobutyl and chlorobutoxy butyl esters are also compatible with alkyd resins such as glyceryl phthalate, coumaron-indene resin and methyl methacrylate.

In order further to illustrate my invention, but without being limited thereto, the following examples are given:

Example I 830 parts by weight of tetramethylene oxide and 0.1 part by weight of freshly fused zinc chloride are placed in a reaction vessel and 453 parts by weight of acetyl chloride are gradually added thereto. The resulting reaction is exothermic and as the temperature of the reaction mixture rises refluxing commences at about 73° C. At the completion of the addition of the temperature rises to about 84° C. and the reaction mixture is then refluxed for about two hours. Completion of the reaction is determined by diluting about 10 ccs. of the reaction mixture with 90 ccs. of distilled water and observing the amount of water-insoluble product obtained. The greater the amount of water-insoluble product the more nearly complete is the reaction. When no increase in water-insolubles is noted on dilution, after the reaction is continued further, the reaction product is then fractionally distilled. A yield of about 80% of theoretical of chlorobutyl-acetate is obtained boiling at 90° C. at 20 mm. pressure. A yield of 10% of chlorobutoxy-butyl-acetate is obtained also. This compound boils at 168° C. at 31 mm. pressure. Chlorobutyl acetate possesses solvent action on cellulose nitrate, cellulose acetate, cellulose propionate, ethyl cellulose, polyvinyl chloride, alkyd resins, such as glyceryl phthalate, coumaron-indene resin and methyl methacrylate. It is also found to be miscible with pentane and castor oil and many plasticizers. The second compound, i. e., chlorobutoxy-butyl-acetate possesses the same solvent action.

*Example II*

100 parts by weight of tetramethylene oxide are added dropwise to a reaction vessel containing 430 parts by weight of stearyl chloride which has been heated to about 170° C. As the ring-opening and esterification reaction proceeds, the temperature rises to about 200° C. The reaction mixture is refluxed at 200° C. for 8 hours to ensure completion of the reaction. After reaction is complete, the reaction mixture is then fractionally distilled under reduced pressure. The chlorobutyl-stearate formed is a light yellow oil which boils at 255 to 260° C. at 15 mm. pressure, has a density of 0.923 at 25° C. and a refractive index of 1.4545 at 25° C. When heated, this ester is found to be compatible, for example, with cellulose nitrate, cellulose acetate, ester gum, coumaron-indene resin, methyl methacrylate, etc.

*Example III*

144 parts by weight of tetramethylene oxide are added dropwise into a suitable reaction vessel containing 203 parts by weight of phthalyl dichloride heated to about 200° C. The reaction mixture is then refluxed for 4 hours at about 200° C. The unreacted phthalyl dichloride is removed by washing the reaction mixture with a 10% aqueous sodium carbonate solution. On fractional distillation, a fraction comprising di-chlorobutyl-phthalate boiling at 230 to 240° C. under 3 mm. pressure is obtained. This compound has a density of 1.21 at 25° C. and a refractive index of 1.5175 at 25° C. When heated it dissolves cellulose nitrate, cellulose acetate, cellulose propionate, ethyl cellulose, ester gum, glyceryl phthalate, methyl methacrylate, etc. Films of cellulose propionate of 0.3 free hydroxyl groups containing 20 and 30 parts by weight of di-chlorobutyl-phthalate for each 100 parts by weight of the cellulose propionate are clear and tough. The chlorine content lends increased fire retarding action to the plasticized films, as compared to films plasticized with dibutyl phthalate.

*Example IV*

100 parts by weight of ethyl cellulose (45 to 47% ethoxyl) are mixed with 20 parts by weight of di-chlorobutyl-phthalate and 1 part by weight of calcium lactate which acts as a stabilizer. The plasticized ethyl cellulose is then molded into discs at a temperature of 200° C. for 15 minutes. The discs obtained are clear, practically colorless and possess good impact strength and surface hardness.

It is to be understood that the foregoing detailed description is given merely by way of illustration and that many variations may be made therein without departing from the spirit of my invention.

Having described my invention, what I desire to secure by Letters Patent is:

1. A composition of matter comprising an organic derivative of cellulose, selected from the group consisting of cellulose esters and cellulose ethers, plasticized with an ester of an organic acid having a plasticizing action thereon of the following formula

2. A composition of matter comprising cellulose acetate plasticized with an ester of an organic acid having a plasticizing action thereon of the following formula

3. A composition of matter comprising ethyl cellulose plasticized with an ester of an organic acid having a plasticizing action thereon of the following formula

4. A composition of matter comprising cellulose acetate plasticized with di-(chlorobutoxy butyl)-phthalate.

5. A composition of matter comprising ethyl cellulose plasticized with di-(chlorobutoxy butyl)-phthalate.

6. A composition of matter comprising cellulose propionate plasticized with di-(chlorobutoxy butyl)-phthalate.

GERSHON J. SHUGAR.

REFERENCES CITED

The following references are of record in the file of this patent:

UNITED STATES PATENTS

| Number | Name | Date |
| --- | --- | --- |
| Re. 10,879 | Amend | Nov. 8, 1887 |
| 1,027,615 | Lindsay | May 28, 1912 |
| 1,739,315 | Kessler | Dec. 10, 1929 |
| 1,826,691 | Carroll | Oct. 6, 1931 |
| 1,946,643 | Smith | Feb. 13, 1934 |
| 1,949,093 | Van Schaack | Feb. 27, 1934 |
| 2,062,403 | Dreyfus et al. | Dec. 1, 1936 |
| 2,202,041 | Altwegg | May 28, 1940 |

FOREIGN PATENTS

| Number | Country | Date |
| --- | --- | --- |
| 374,322 | Germany | Apr. 21, 1923 |

Certificate of Correction

Patent No. 2,525,961                                October 17, 1950

GERSHON J. SHUGAR

It is hereby certified that error appears in the printed specification of the above numbered patent requiring correction as follows:

Column 1, lines 7, 12 and 13, for the word "organic" read *phthalic*; column 2, line 60, strike out "of" after "addition";

and that the said Letters Patent should be read as corrected above, so that the same may conform to the record of the case in the Patent Office.

Signed and sealed this 26th day of December, A. D. 1950.

[SEAL]

THOMAS F. MURPHY,
*Assistant Commissioner of Patents.*